United States Patent
Matsumoto et al.

(10) Patent No.: US 7,260,657 B2
(45) Date of Patent: Aug. 21, 2007

(54) SERIAL DATA TRANSFERRING APPARATUS

(75) Inventors: Masahiro Matsumoto, Hitachi (JP); Fumio Murabayashi, Urizura (JP); Hiromichi Yamada, Hitachi (JP); Keiji Hanzawa, Mito (JP); Hiroyasu Sukesako, Hitachinaka (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 0 days.

(21) Appl. No.: 10/491,285

(22) PCT Filed: Oct. 2, 2001

(86) PCT No.: PCT/JP01/08675

§ 371 (c)(1), (2), (4) Date: Dec. 20, 2004

(87) PCT Pub. No.: WO03/032567

PCT Pub. Date: Apr. 17, 2003

(65) Prior Publication Data

US 2005/0091428 A1 Apr. 28, 2005

(51) Int. Cl.
*G06F 3/00* (2006.01)
*G06F 5/00* (2006.01)

(52) U.S. Cl. .................. 710/52; 375/355; 375/362; 375/363; 375/364; 375/365; 375/366; 375/368

(58) Field of Classification Search ........ 375/354–376; 398/183; 710/14, 33, 52, 69, 71, 60–61; 713/375, 400; 370/310–350, 498–520
See application file for complete search history.

(56) References Cited

U.S. PATENT DOCUMENTS 4,048,620 A * 9/1977 Crandall et al. ....... 340/825.53

(Continued)

FOREIGN PATENT DOCUMENTS

EP 1 014 273 A2 6/2000

(Continued)

OTHER PUBLICATIONS

Prof. Borivoje Nikolic, Lecture 25: Asynchronous and Self-Timed Logic, Spring 2000, http://bwrc.eecs.berkeley.edu/Classes/icdesign/ee241_s00/LECTURES/lecture25-asynch.pdf.*

(Continued)

*Primary Examiner*—Donald Sparks
*Assistant Examiner*—Chun-Kuan Lee
(74) *Attorney, Agent, or Firm*—Crowell & Moring LLP

(57) ABSTRACT

A master unit sends a start signal to a slave unit. When receiving the start signal from the master unit, the slave unit sends, to the master unit, a synchronization field that is a data train (pulse signal) indicative of a transfer clock with which the slave unit is able to perform transferring and receiving operations. The master unit sends, to the slave unit, command data in accordance with the transfer clock indicated by the synchronization field sent from the slave unit. In response to the command data sent from the master unit, the slave unit sends, to the master unit, response data in accordance with the transfer clock indicated by the synchronization field. Thus, in a communication system employing a serial data transferring apparatus of the present invention, the master unit establishes the synchronization for the data transfer, while the slave unit is free from a burden of establishing the synchronization for the data transfer. A serial data transferring apparatus is realized which can simplify the structure of the slave unit, cut the total cost, and reduce noise.

9 Claims, 11 Drawing Sheets

U.S. PATENT DOCUMENTS

| | | | | |
|---|---|---|---|---|
| 4,337,463 A | * | 6/1982 | Vangen | 340/825.2 |
| 4,837,781 A | * | 6/1989 | Hickling | 375/327 |
| 5,600,682 A | * | 2/1997 | Lee | 375/354 |
| 6,215,364 B1 | * | 4/2001 | Hwang et al. | 331/57 |
| 6,389,493 B1 | * | 5/2002 | Barkley et al. | 710/110 |
| 6,504,633 B1 | * | 1/2003 | Hovorka et al. | 398/183 |
| 6,735,247 B2 | * | 5/2004 | Lundby | 375/227 |
| 6,806,808 B1 | * | 10/2004 | Watters et al. | 340/10.41 |
| 6,845,136 B1 | * | 1/2005 | Van Der Putten et al. | 375/358 |

FOREIGN PATENT DOCUMENTS

| | | |
|---|---|---|
| GB | 1 310 509 | 3/1973 |
| JP | 50-72503 A | 6/1975 |
| JP | 56-106460 A | 8/1981 |
| JP | 56-153866 A | 11/1981 |
| JP | 59-77789 A | 5/1984 |
| JP | 61-42156 U | 3/1986 |
| JP | 5-91163 A | 4/1993 |
| JP | 2000-196700 | 7/2000 |

OTHER PUBLICATIONS

European Search Report dated May 8, 2006 (Three (3) pages).

* cited by examiner

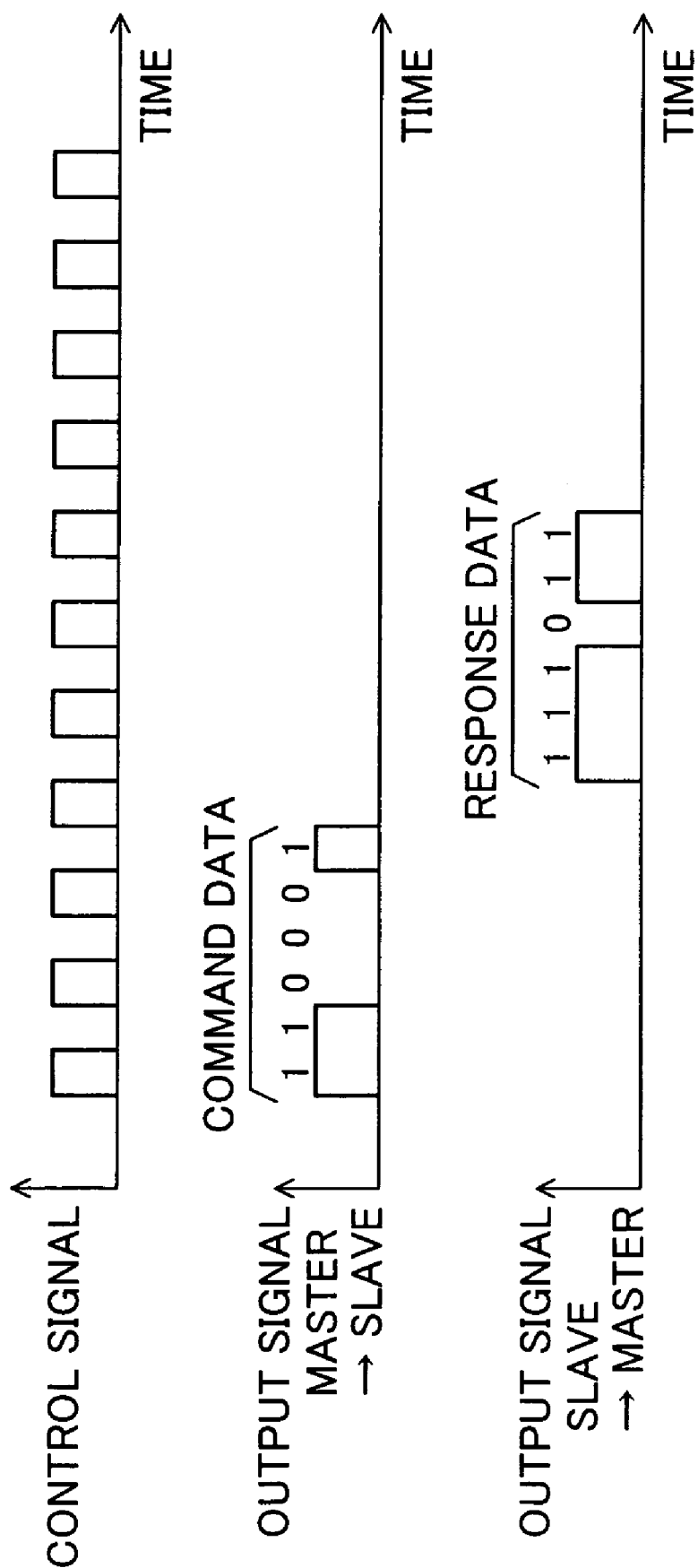

SERIAL DATA TRANSFERRING APPARATUS

TECHNICAL FIELD

The present invention relates to a serial data transferring apparatus, which requires synchronization in data transfer to be established between the receiving side and the transmitting side.

BACKGROUND ART

In serial data transfer, synchronization for transfer must be established so that data is transferred between the receiving side and the transmitting side. For this reason, a quartz oscillator having high oscillation accuracy has been used, or a PLL (Phase-Locked Loop) or the like has been used to realize frame synchronization for the purpose of establishing the synchronization in data transfer with higher accuracy.

Because of the quartz oscillator and the PLL being expensive, however, it has been difficult to realize an inexpensive sensor device, actuator device, etc. which can realize the serial data transfer.

Accordingly, the inexpensive sensor device is mainly employed in the signal transfer using an analog voltage, and this type of signal transfer has limitations in transfer distance and transfer accuracy.

With that problem in mind, there is proposed a start-stop synchronization data transfer method for transferring serial data with an oscillator having low frequency accuracy, as disclosed in JP,A 2000-196700.

The disclosed start-stop synchronization data transfer method requires neither the expensive quartz oscillator nor the PLL.

DISCLOSURE OF THE INVENTION

However, the start-stop synchronization data transfer method requires a CR oscillator oscillating at frequency several hundreds times as high as a transfer clock of the data, and a digital circuit, e.g., a counter, which operates at the oscillation frequency of the CR oscillator and detects the transfer clock to establish the synchronization.

In the prior art described above, therefore, the transfer clock is limited by the highest oscillation frequency of the CR oscillator and the highest operation frequency of the digital circuit. This has invited a limitation in increasing the transfer clock frequency beyond such a limit.

Also, because an analog circuit handling a minute voltage is affected by noises generated from the CR oscillator and the digital circuit each operating at the high frequency, a resulting deterioration of accuracy has raised a difficulty in applying the prior-art method to a sensor device handling a minute signal.

Further, because of requiring the CR oscillator and the digital circuit, e.g., the counter, as mentioned above, a scale of an overall digital circuit for establishing the synchronization is increased. For that reason, it has also been difficult to realize an inexpensive sensor device, actuator device, etc. which can realize the serial data transfer.

An object of the present invention is to provide a serial data transferring apparatus, which is inexpensive and can reduce noise.

To achieve the above object, the present invention is constituted as follows:

(1) A serial data transferring apparatus comprises means for receiving a start signal indicative of start of data transfer from the transmitting side; means for determining that the receiving means has received the start signal, and generating a data train indicative of a transfer clock of serial data to be transmitted; and serial data output means for outputting the data train indicative of the transfer clock to the transmitting side.

(2) In above (1), preferably, after replying the data train indicative of the transfer clock of the serial data to the transmitting side, the receiving means receives a train of serial data transmitted from the transmitting side in accordance with the transfer clock.

(3) In above (1), preferably, information indicative of a target, which is going to receive the start signal, is superimposed on the start signal.

(4) In above (3), preferably, information indicative of the target, which is going to receive the start signal, is represented by the number of pulses.

(5) In above (1), preferably, the start signal is a signal having a state fixed to a low level or a high level for a certain period and containing information indicative of a target of transmission.

(6) In above (1), preferably, the serial data transferring apparatus further comprises analog data output means and selecting means for selectively changing over the analog data output means and the serial data output means, wherein upon receiving the start signal, the selecting means changes over output means from the analog data output means to the serial data output means.

(7) In above (6), preferably, the serial data transferring apparatus according further comprises a sensing element for detecting a physical variable of a target to be measured; adjusting means for adjusting a detected value from the sensing element to a predetermined characteristic, and storage means for storing characteristic data that is the predetermined characteristic to be adjusted by the adjusting means and is transmitted from the transmitting side, wherein the start signal is a signal having a predetermined voltage level and the voltage of the start signal is employed as a voltage source for storing the characteristic data in the storage means.

(8) A serial data transferring apparatus comprises means for transmitting a start signal indicative of start of data transfer to a particular receiving side; means for receiving a data train indicative of a transfer clock of serial data transmitted from the particular receiving side; and means for transmitting serial data to the particular receiving side in sync with the transfer clock of the serial data transmitted from the particular receiving side.

(9) In a serial data transferring apparatus comprising a master unit transmitting serial data and a slave unit receiving the serial data, the master unit comprises means for transmitting a start signal indicative of start of data transfer to a particular slave unit, means for receiving a data train indicative of a transfer clock of serial data transmitted from the slave unit, and means for transmitting serial data to the slave unit in sync with the transfer clock of the serial data transmitted from the slave unit, and the slave unit comprises means for receiving a start signal indicative of start of data transfer from the master unit; means for determining that the receiving means has received the start signal, and generating a data train indicative of a transfer clock of serial data to be transmitted; and serial data output means for outputting the data train indicative of the transfer clock to the master unit.

(10) A serial data transferring apparatus comprises means for transmitting, to the transmitting side, a start signal indicative of start of data transfer and a data train indicative of a transfer clock of serial data to be received; and means for, after transmitting the data train indicative of the transfer clock of the serial data to the transmitting side, receiving a train of serial data transmitted from the transmitting side in accordance with the transfer clock.

BRIEF DESCRIPTION OF THE DRAWINGS

FIG. 17 is a timing chart of signals in a modification of the sensor device including the fourth embodiment.

BEST MODE FOR CARRYING OUT THE INVENTION

Embodiments of the present invention will be described below with reference to the accompanying drawings.

At the outset, a serial data transferring apparatus according to a first embodiment of the present invention will be described with reference to FIGS. 1, 2, 3, 4, 5 and 6.

Figure 1:
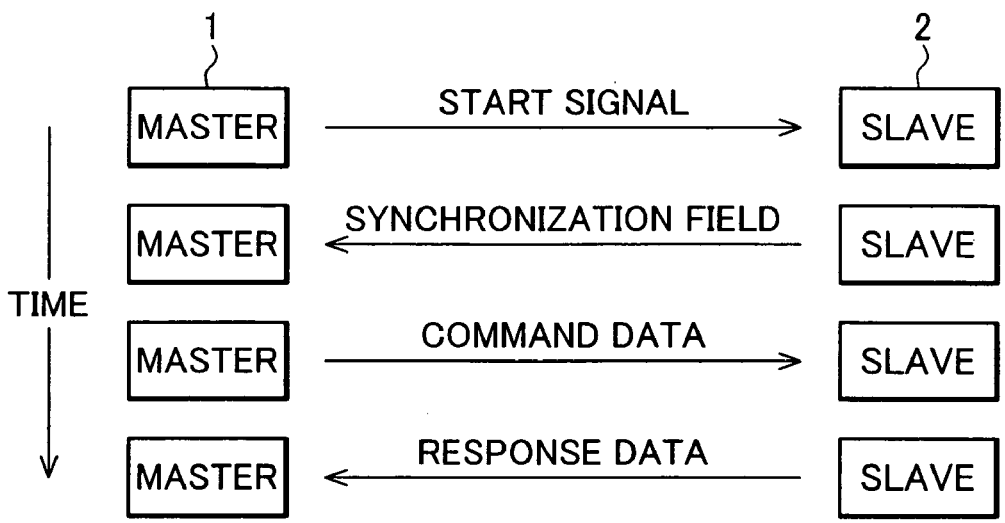
FIG. 1 is a diagram of a data communication sequence in a serial data transferring apparatus according to a first embodiment of the present invention.
Figure 2:
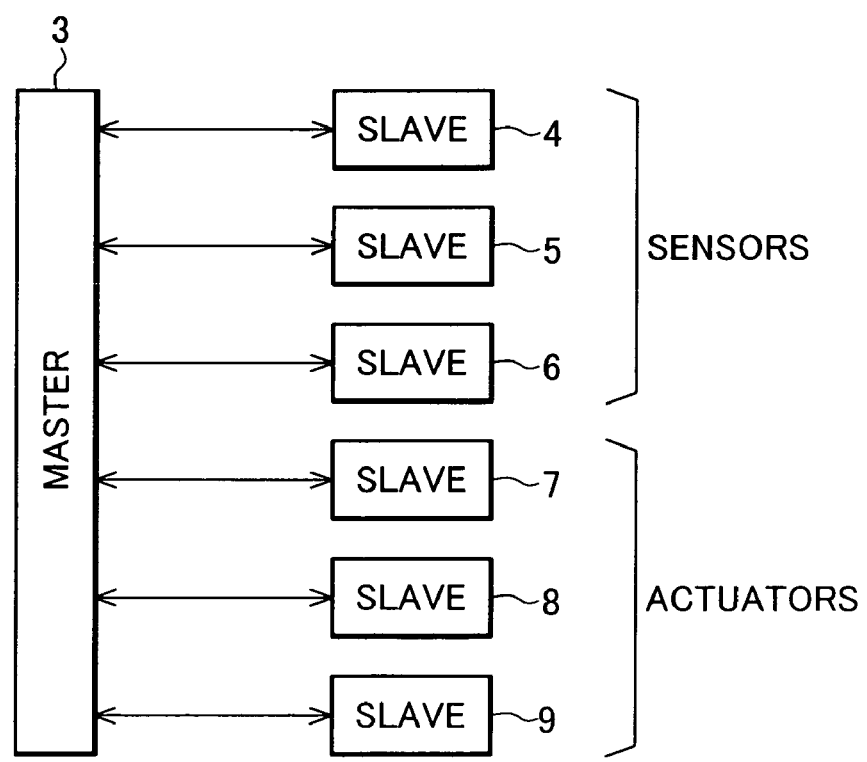
FIG. 2 is a diagram showing a system configuration for the serial data transferring apparatus according to the first embodiment.

FIG. 1 shows a data communication sequence in a serial data transferring apparatus according to the first embodiment of the present invention, and FIG. 2 shows a schematic system configuration for the serial data transferring apparatus according to the first embodiment.

Figure 3:
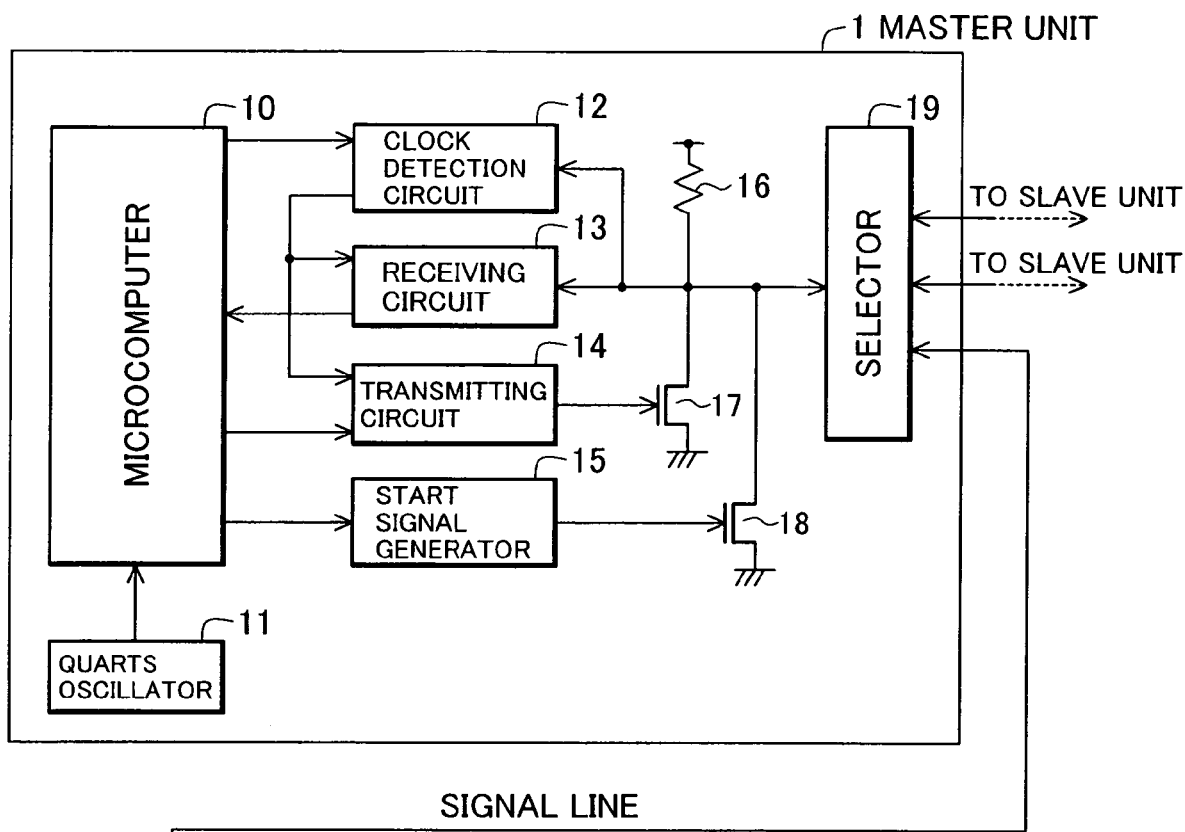
FIG. 3 is a block diagram showing an internal configuration of a master unit and a slave unit in the serial data transferring apparatus according to the first embodiment.
Figure 3:
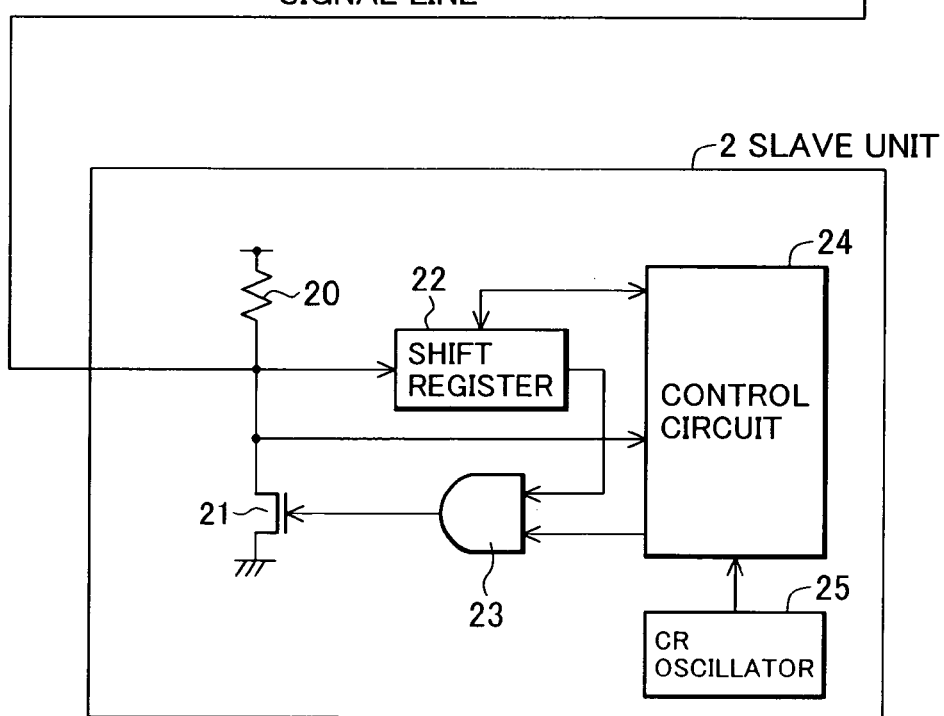
Figure 4:
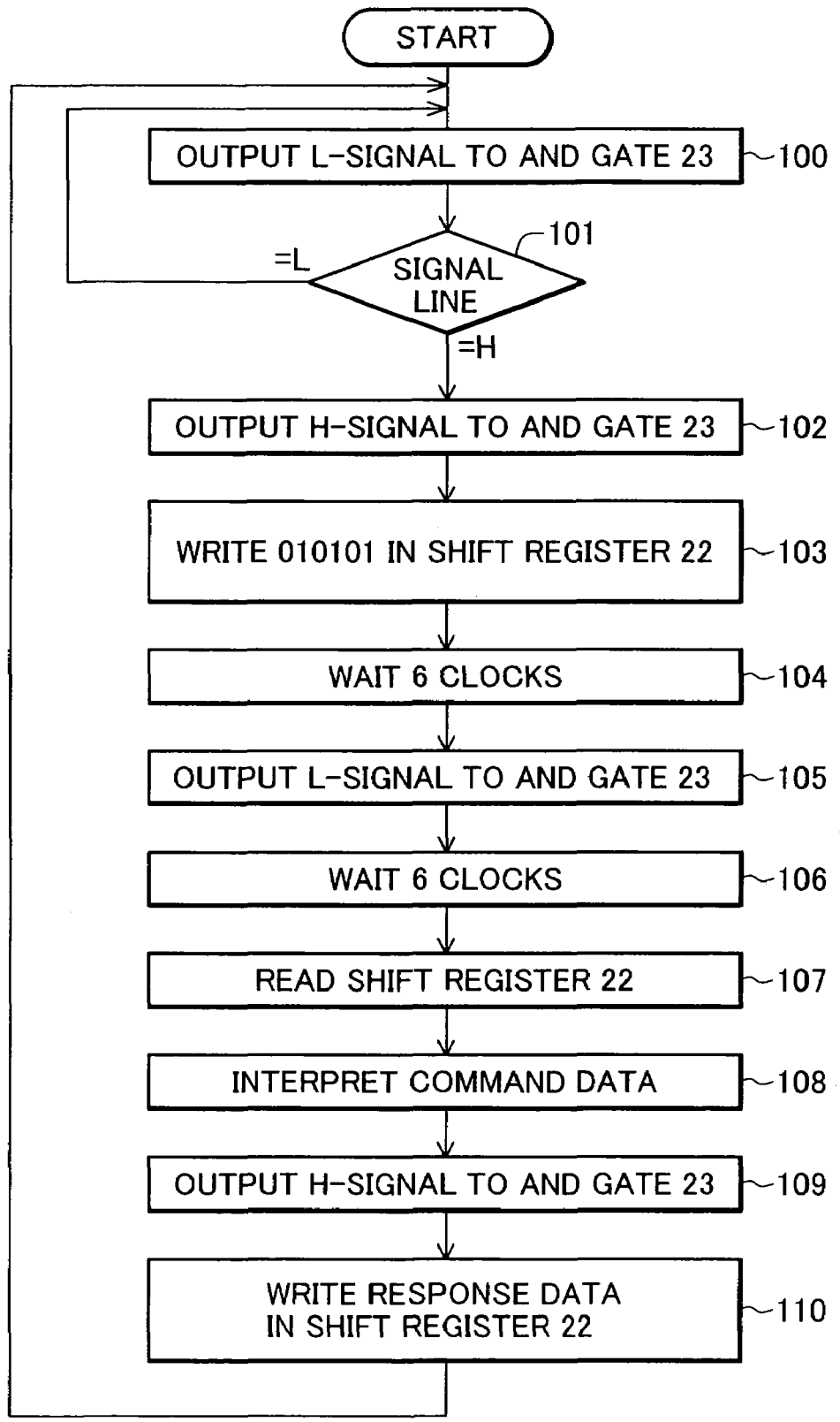
FIG. 4 is a flowchart showing a control sequence of the slave unit according to the first embodiment.

Also, FIG. 3 shows an internal configuration of a master unit and a slave unit in the serial data transferring apparatus according to the first embodiment of the present invention, and FIG. 4 shows a control sequence of the slave unit in the serial data according to the first embodiment of the present invention.

Figure 5:
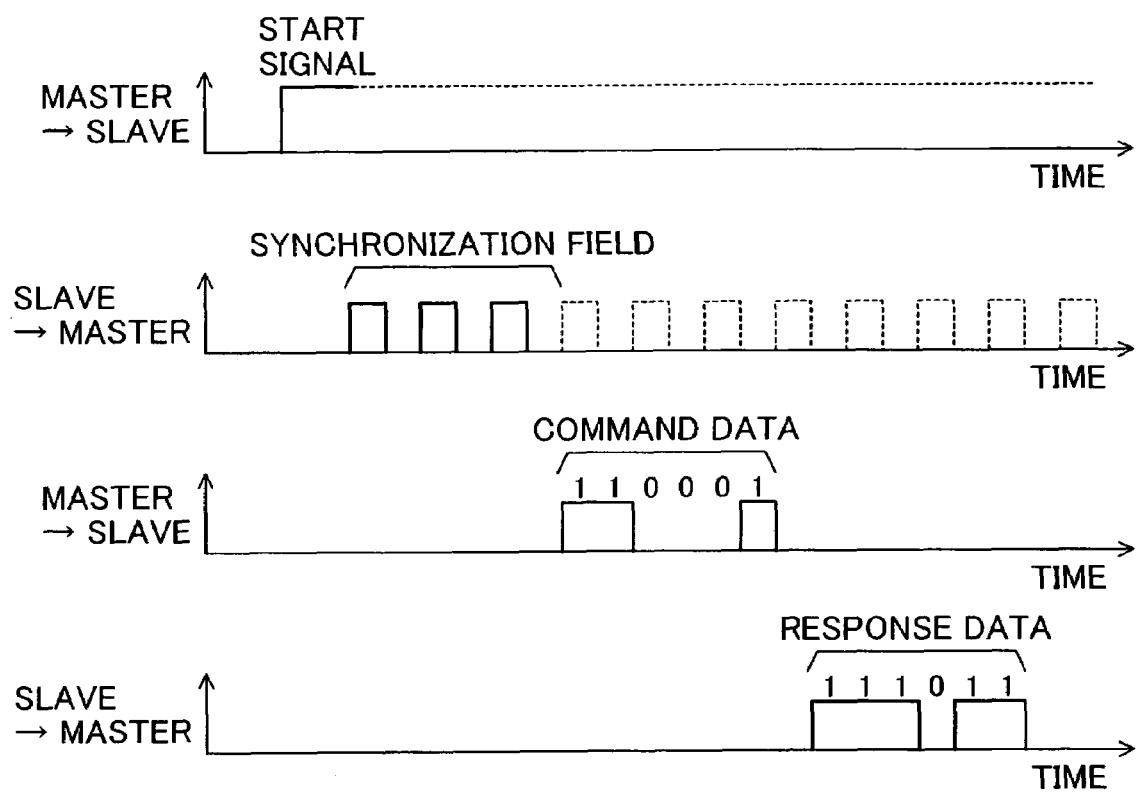
FIG. 5 is a timing chart of signals in the first embodiment.
Figure 6:
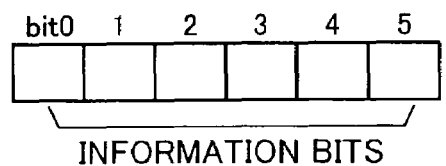
FIG. 6 is a diagram showing a bit configuration of command data and response data in the first embodiment.

FIG. 5 is a timing chart of transfer data in the first embodiment of the present invention, and FIG. 6 shows a bit configuration of command data and response data in the first embodiment of the present invention.

With reference to FIG. 1, a description is first made of the data communication sequence in the serial data transferring apparatus according to the first embodiment of the present invention.

In the data communication sequence in the serial data transferring apparatus according to the first embodiment of the present invention, a master unit 1 first sends a start signal to a slave unit 2. When receiving the start signal from the master unit 1, the slave unit 2 sends, to the master unit 1, a synchronization field that is a data train (pulse signal) indicative of a transfer clock with which the slave unit 2 is able to perform transferring and receiving operations.

Then, the master unit 1 sends, to the slave unit 2, command data in accordance with the transfer clock indicated by the synchronization field sent from the slave unit 2. In response to the command data sent from the master unit 1, the slave unit 2 sends, to the master unit 1, response data in accordance with the transfer clock indicated by the synchronization field.

Thus, in a communication system employing the serial data transferring apparatus according to the first embodiment of the present invention, the master unit 1 establishes the synchronization for the data transfer, while the slave unit 2 is free from a burden of establishing the synchronization for the data transfer.

The expression "master unit" is used herein for the reason that the master unit 1 serves as a manager (master) for sending the start signal to the slave unit 2 and starting communication with respect to the slave unit 2. In other words, the first embodiment of the present invention is constructed such that the master unit 1 generating the start signal and requesting communication performs serial communication in match with the operation clock of the slave unit 2 having no precise clock.

The system configuration for the serial data transferring apparatus according to the first embodiment of the present invention will next be described with reference to FIG. 2.

By employing the serial data transferring apparatus according to the first embodiment of the present invention, as shown in FIG. 2, one-to-one communication can be realized between a master unit 3 and slave units 4, 5, 6, 7, 8 and 9 each of which is connected to the master unit 3 by a single line.

Further, the master unit 3 and the slave units 4, 5, 6, 7, 8 and 9 are each provided with an open-drain or open-collector output driver for realizing two-way communication therebetween.

In an illustrated example of the system configuration, the master unit 3 serves as a controller for collecting information from a plurality of slave units 4, 5 and 6, which are sensors, and controlling a plurality of slave units 7, 8 and 9, which are actuators.

In such a system employing the serial data transferring apparatus according to the first embodiment of the present invention, the master unit 3 solely takes a burden of establishing the synchronization for the data transfer, while the slave units 4, 5, 6, 7, 8 and 9 are free from the burden of establishing the synchronization for the data transfer. As a result, the construction of each of the slave units 4, 5, 6, 7, 8 and 9 can be simplified.

With the construction described above, even the slave units 4, 5, 6, 7, 8 and 9 in the form of sensors and actuators, which are constructed of primarily analog circuits, can be inexpensively incorporated in an apparatus for serially transferring digital signals.

Also, since the synchronization for the data transfer is established only on the side of the master unit 3 instead of establishing the synchronization for the data transfer on the side of each of the slave units 4, 5, 6, 7, 8 and 9 as practiced in the above-mentioned prior art, the number of circuits required in an overall system for establishing the synchronization for the data transfer can be reduced and the serial data transfer can be realized without considerably increasing the circuit scale as a whole of the system.

In the case of trying to establish the synchronization for the data transfer on the side of each of the slave units 4, 5, 6, 7, 8 and 9, the slave units 4, 5, 6, 7, 8 and 9 are each required to include a digital circuit, e.g., a counter, for establishing the synchronization with an oscillator that oscillates signals at frequency several hundreds times as high as the data transfer rate.

However, if such a digital circuit or the like is provided, however, the high-frequency oscillator and the digital circuit operating at the high frequency become serious noise sources in, e.g., a sensor handling a minute signal.

For that reason, the frequency of the oscillator and the operating frequency of the digital circuit cannot be increased. Further, in the case of establishing the synchronization for the data transfer on the side of each of the slave units 4, 5, 6, 7, 8 and 9 as practiced in the above-mentioned prior art, a maximum transfer clock is limited by the slave unit having the lowest transfer clock and the system transfer clock cannot be increased beyond it.

In contrast, with the first embodiment of the present invention, the serial transfer can be performed in accordance with even a maximum one among clocks of the slave units 4, 5, 6, 7, 8 and 9, and hence the communication rate in the overall system can be increased.

Further, when a controller is assumed as an application target of the master unit 3, a microcomputer is used as the controller in many cases because absolute time management is required for the data transfer and a large amount of arithmetic processing is needed. An apparatus utilizing a microcomputer for that purpose includes a high-frequency quartz oscillator for operating the microcomputer and many high-frequency digital circuits in most cases.

Accordingly, it is easier to install a circuit for establishing the synchronization for the data transfer in the master unit 3 as compared with the slave units 4 to 9 (namely, there is no difficulty in installing a digital circuit operating at high frequency because the master unit 3 already includes a high-frequency oscillator).

The general internal configuration of the master unit 1 and the slave unit 2 in the serial data transferring apparatus according to the first embodiment of the present invention will next be described with reference to FIG. 3.

The master unit 1 in the serial data transferring apparatus according to the first embodiment of the present invention comprises a microcomputer 10 for collecting information from the slave units serving as sensors and controlling actuators, a quartz oscillator 11 for generating a basic clock signal for operating the microcomputer 10, a start signal generator 15 for generating a start signal, a clock detection circuit 12 for detecting a transfer clock from a synchronization field, a transmitting circuit 14 for sending command data, a receiving circuit 13 for receiving response data, a pull-up resistor 16 for pulling up a signal line, transistors 17, 18 for driving the signal line, and a selector 19 for selectively changing over connection to the slave units.

The start signal generator 15, the clock detection circuit 12, the transmitting circuit 14, and the receiving circuit 13 are controlled with the operation of the microcomputer 10.

The slave unit 2 in the serial data transferring apparatus according to the first embodiment of the present invention comprises a pull-up resistor 20 for pulling up a signal line, a transistor 21 for driving the signal line, a shift register 22 for executing serial/parallel conversion of the command data and the response data, an AND gate 23 for controlling an input and an output of the slave unit 2, a control circuit 24 for detecting the start signal, making an input/output to and from the shift register 22, and applying a signal to the AND gate 23, and a CR oscillator 25 for generating a clock signal to operate the control circuit 24 and the shift register 22.

The operations of the master unit 1 and the slave unit 2 will be described below. It is assumed that the command data and the response data are each in the form of a data train having 6 bits as information bits, as shown in FIG. 6.

Referring to FIG. 4, in step 100, the control circuit 24 of the slave unit 2 first outputs a low-level signal to the AND gate 23, thereby turning off the transistor 21. Then, the slave unit 2 waits in step 101 until, as shown in FIG. 5, the master unit 1 sends the start signal and the signal line takes a high level.

When issuing a communication request to the slave unit 2, the master unit 1 selects the slave unit 2 by the selector 19 and outputs the start signal from the start signal generator 15 (turns the signal line to a high level).

Upon receiving the start signal, the slave unit 2 proceeds to step 102 in which the control circuit 24 outputs a high-level signal to the AND gate 23. Then, in step 103, a binary number of 010101 is written in the shift register 22.

Subsequently, in step 104, the shift register 22 waits for 6 clocks. In step 105, the control circuit 24 outputs a low-level signal to the AND gate 23.

Thus, by causing the shift register 22 to always perform the shift operation in accordance with a clock signal from the CR oscillator 25, the data 010101 written in the shift register 22 is outputted to the signal line through the AND gate 23 and the transistor 21 so that the data 101010 is outputted to the signal line. This data serves as data indicating ½ of the transfer clock of the slave unit 2.

In the present invention, the data indicating ½ of the transfer clock is called a synchronization field. The master unit 1 detects the transfer clock signal from the synchronization field by the clock detector 12 and sends the command data from the transmitting circuit 14.

As shown in FIG. 5, the command data is outputted in phase with the signal of 101010 in the synchronization field.

With the process described above, the command data can be accurately transferred to the shift register 22 just by causing the shift register 22 of the slave unit 2 to perform the shift operation in accordance with the output clock of the CR oscillator 25.

Accordingly, after the control circuit 24 has sent the data of the synchronization field, the slave unit 2 can read the command data just by waiting for 6 clocks in step 106 and then reading the shift register 25 in step 107.

Then, the slave unit 2 interprets the read command data in step 108, outputs a high-level signal to the AND gate 23 in step 109, and writes the response data in the shift register 22 in step 110. The response data written in the shift register 22 is hence outputted to the signal line through the AND gate 23 and the transistor 21.

The master unit 1 reads the response data, which has been outputted to the signal line, by the receiving circuit 13, thereby completing the communication with respect to the slave unit 2.

Thus, with the serial data transferring apparatus according to the first embodiment of the present invention, the slave unit 2 can be constructed of a very simple structure.

Also, since there is no vain time in realizing the data communication, the transmitting and receiving operations can be realized at a high rate.

Further, the oscillation frequency of the CR oscillator 25 may be equal to the frequency of the transfer clock, and the oscillation frequency several hundred times as high as the transfer clock is no longer required. Hence, there occurs no problem of noise, which is otherwise caused with the provision of a high-frequency oscillator.

Figure 7:
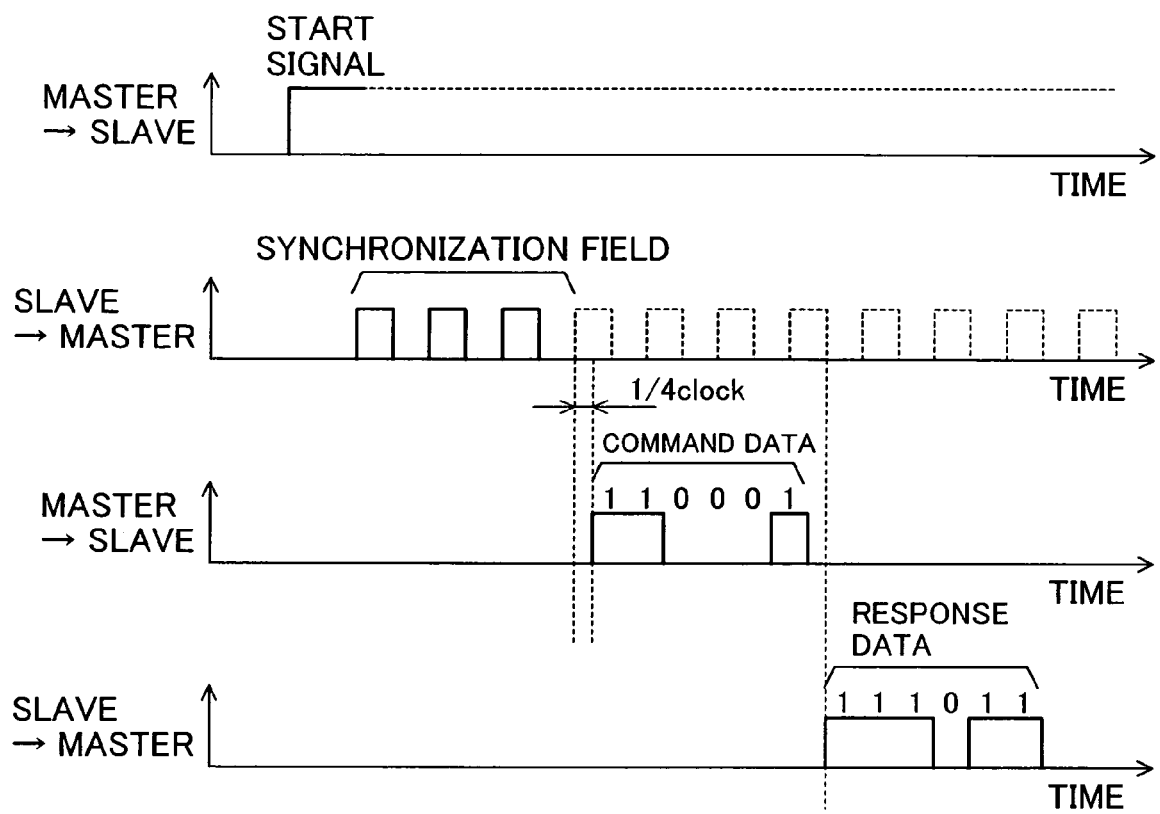
FIG. 7 is a timing chart of signals in a modification of the first embodiment.

A modification of the serial data transferring apparatus according to the first embodiment of the present invention will now be described with reference to FIG. 7. FIG. 7 is a timing chart of signals in the modification of the first embodiment. As seen from comparison with the embodiment shown in FIG. 5 wherein no substantial phase difference exists between the command data and the synchronization field, the modification shown in FIG. 7 differs from the embodiment shown in FIG. 5 in that the command data is delayed in phase by a ¼-clock cycle relative to the synchronization field in the modification shown in FIG. 7.

With the modification shown in FIG. 7, the input timing can be more reliably secured for the shift register 22.

More specifically, because by causing the shift register 22 performs the shift operation just in accordance with the output clock of the CR oscillator 25, inputting to the shift register 22 is executed at the rising edge and the falling edge of the synchronization field.

Therefore, if the command data is synchronized with the rising edge and the falling edge of the synchronization field, there is a possibility that a hold time and a setup time required for the shift register 22 to input the command data may be insufficient.

To eliminate such a possibility, the rising of the command data is delayed in phase by a ¼-clock cycle relative to the synchronization field so that the hold time and the setup time are reliably secured.

Furthermore, since the time of ¼-clock cycle is present until the command data is transmitted after receiving the synchronization field, a sufficient processing time for the microcomputer 10 can also be secured.

Incidentally, the delay in phase is not limited to the ¼-clock cycle, and it may be set to any suitable predetermined value.

Another modification of the serial data transferring apparatus according to the first embodiment of the present invention will now be described with reference to FIG. 8.

Figure 8:
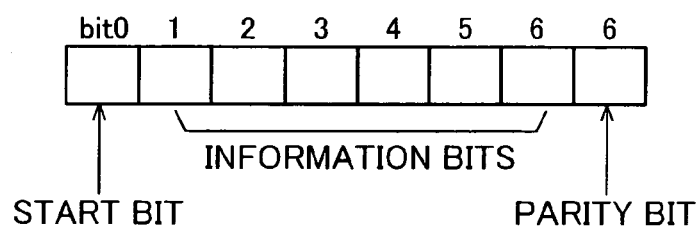
FIG. 8 is an illustration showing a bit configuration of command data and response data used in the modification of the first embodiment.

FIG. 8 is an illustration showing a bit configuration of the command data and the response data used in the modification of the first embodiment.

In this another modification, the bit configuration of the command data and the response data used in the serial data transferring apparatus is set to include a start bit as shown in FIG. 8. With the presence of the start bit, start-stop synchronization can be realized and therefore phase matching is facilitated.

Furthermore, since a parity bit is also included, reliability of the communication can be improved.

Still another modification of the serial data transferring apparatus according to the first embodiment of the present invention will now be described with reference to FIG. 9.

Figure 9:
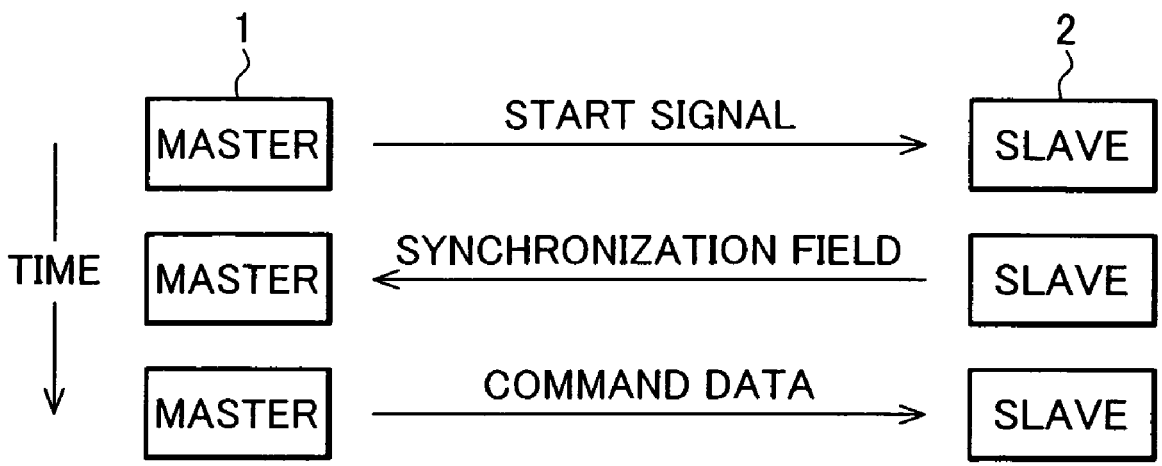
FIG. 9 is a diagram showing a modification of the communication sequence in the serial data transferring apparatus according to the first embodiment.

FIG. 9 is a diagram for explaining a communication sequence in still another modification of the first embodiment. In the modification shown in FIG. 9, the response data is not sent from the slave unit 2. This modification is adapted for the case of the slave unit 2 being an actuator or the like because, in such a case, the communication just requires outputting from the master unit 1 to the slave unit 2 and there is no necessity of sending a response.

Figure 10:
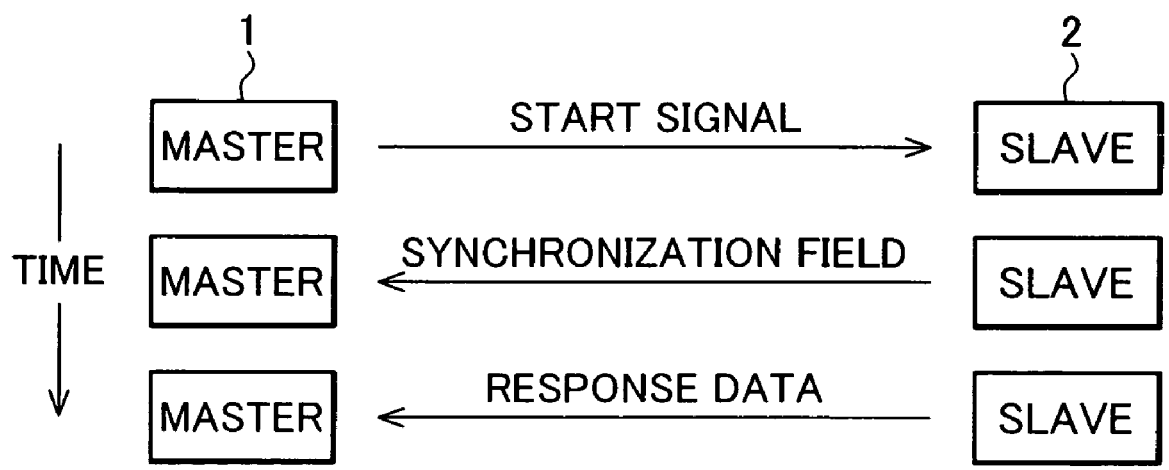
FIG. 10 is a diagram showing a modification of the communication sequence in the serial data transferring apparatus according to the first embodiment.

Still another modification of the serial data transferring apparatus according to the first embodiment of the present invention will now be described with reference to FIG. 10. The modification of FIG. 10 is shown as a diagram for explaining a communication sequence in the serial data transferring apparatus according to the first embodiment. In the modification shown in FIG. 10, the command data is not sent from the master unit 1.

This modification is adapted for the case of the slave unit 2 being a sensor or the like because, in such a case, the communication just requires outputting of a measured result from the slave unit 2 to the master unit 1 and there is no necessity of receiving the command data.

However, when the sensor serving as the slave unit 2 has a plurality of measuring points or measures a plurality of physical variables, or when the sensor has the function such as failure diagnosis, the command data is of course required. In addition, the command data is effective in changing over the measuring points or the measured physical quantities from one to another, or making a shift to a diagnosis mode.

A serial data transferring apparatus according to a second embodiment of the present invention will be described below with reference to FIGS. 11 and 12.

Figure 11:
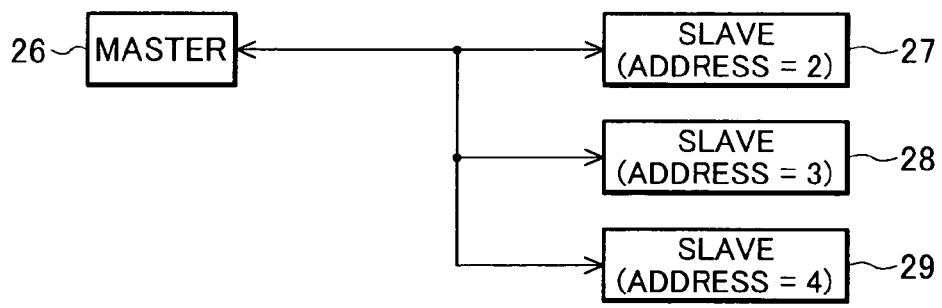
FIG. 11 is a diagram showing a system configuration of a serial data transferring apparatus according to a second embodiment of the present invention.
Figure 12:
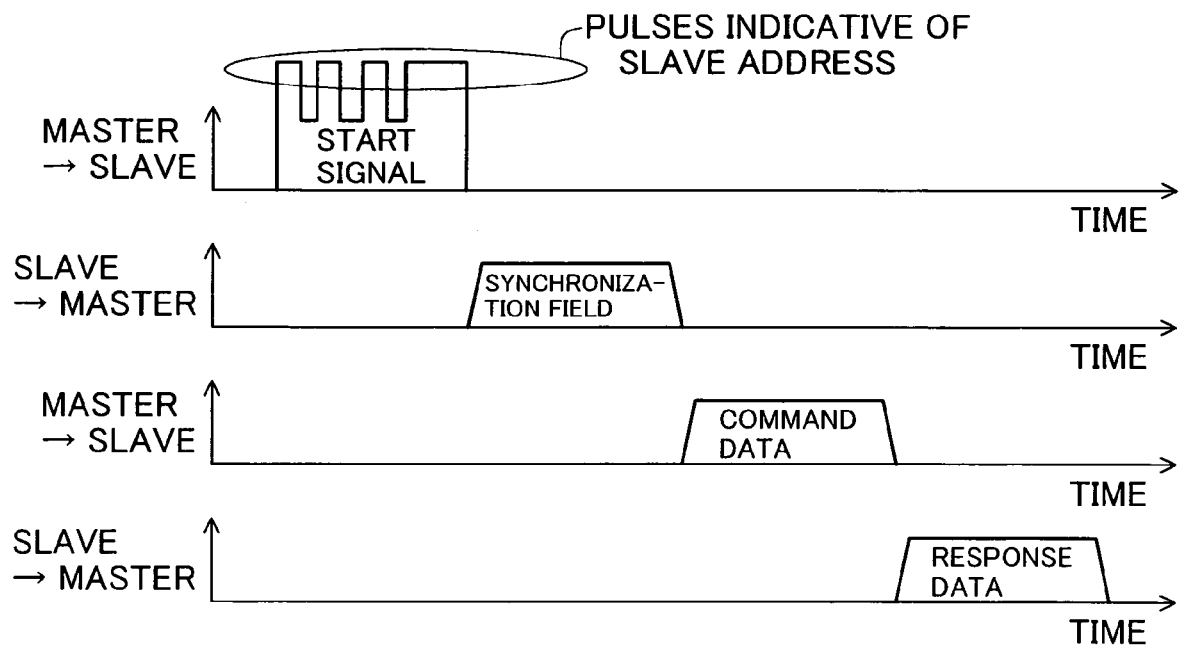
FIG. 12 is a timing chart of signals in the serial data transferring apparatus according to the second embodiment.

FIG. 11 shows a general system configuration of the serial data transferring apparatus according to the second embodiment of the present invention, and FIG. 12 is a timing chart of signals in the serial data transferring apparatus according to the second embodiment of the present invention.

In FIG. 11, the system configuration of the serial data transferring apparatus according to the second embodiment of the present invention is designed as a one-to-multiple communication system in which one signal line extended from a master unit 26 is connected to slave units 27, 28 and 29; namely one master unit 26 is communicated with a plurality of slave units.

In a communication system according to the second embodiment of the present invention, as shown in FIG. 12, information representing an address of each slave unit (e.g., an address 2 of the slave unit 27, an address 3 of the slave unit 28, and an address 4 of the slave unit 29) is superimposed, as the number of pulses, on the start signal from the master unit 26.

Accordingly, which one of the slave units 27, 28 and 29 has been selected can be identified by monitoring the signal line with two comparators having thresholds different from each other, detecting the start signal with the comparator having a first threshold, detecting pulses in the signal indicative of the address with the comparator having a second threshold, and counting the number of detected pulses.

In the embodiment shown in FIG. 12, since the number of pulses superimposed on the start signal is four, the slave unit having the address 4, i.e., the slave unit 29, is selected.

With the construction described above, even when the synchronization is not established between the master unit 26 and the slave units 27, 28 and 29, selected information can be transferred to each of the slave units 27, 28 and 29.

Then, as in the first embodiment, the selected slave unit (slave unit 29 in the embodiment of FIG. 12) replies the synchronization field, receives the command data, and replies the response data.

As another method for superimposing information indicative of the address of the slave unit on the start signal, it is also conceivable to change an amplitude, a pulse width, etc. of the start signal in accordance with the address of the slave unit.

Thus, the second embodiment of the present invention can also provide similar advantages to those obtainable with the first embodiment.

Figure 13:
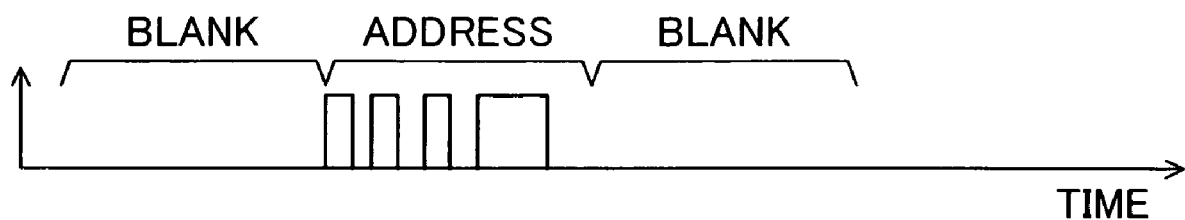
FIG. 13 is a waveform chart of a start signal used in a serial data transferring apparatus according to a third embodiment of the present invention.

A serial data transferring apparatus according to a third embodiment of the present invention will be described below with reference to FIG. 13. FIG. 13 shows a waveform of the start signal used in the serial data transferring apparatus according to the third embodiment of the present invention.

In the third embodiment of the present invention, the start signal used in the above-described second embodiment is modified as shown in FIG. 13. More specifically, the start signal is made up of two blanks (each meaning a state where a signal is absent for a certain period), and pulses indicative of the address of the slave unit are superimposed between the two blanks.

The use of the start signal formed as shown in FIG. 13 can also provide similar advantages to those obtainable with the first embodiment.

Figure 14:
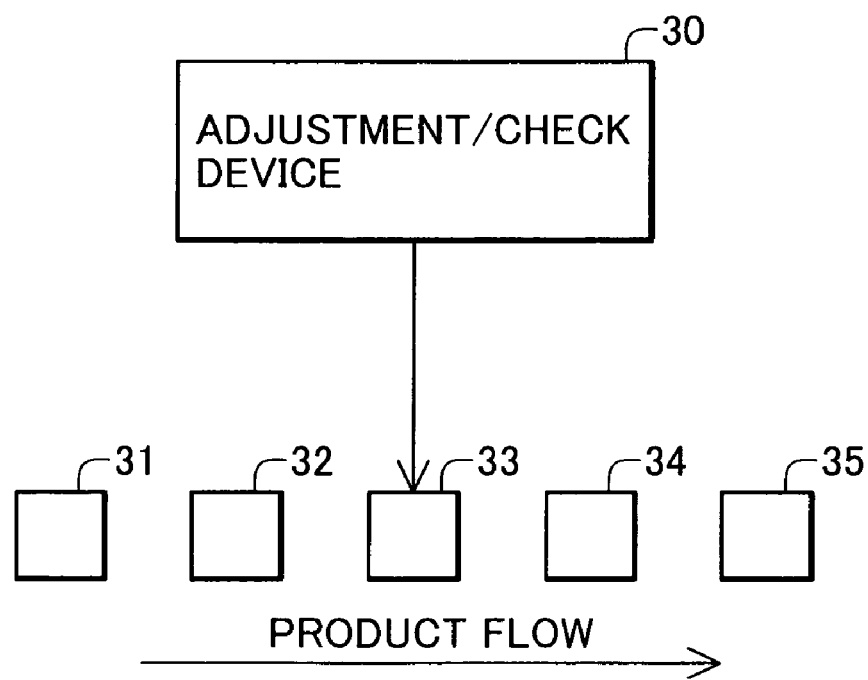
FIG. 14 is a diagram showing a production line of sensor devices each including a serial data transferring apparatus according to a fourth embodiment of the present invention.
Figure 15:
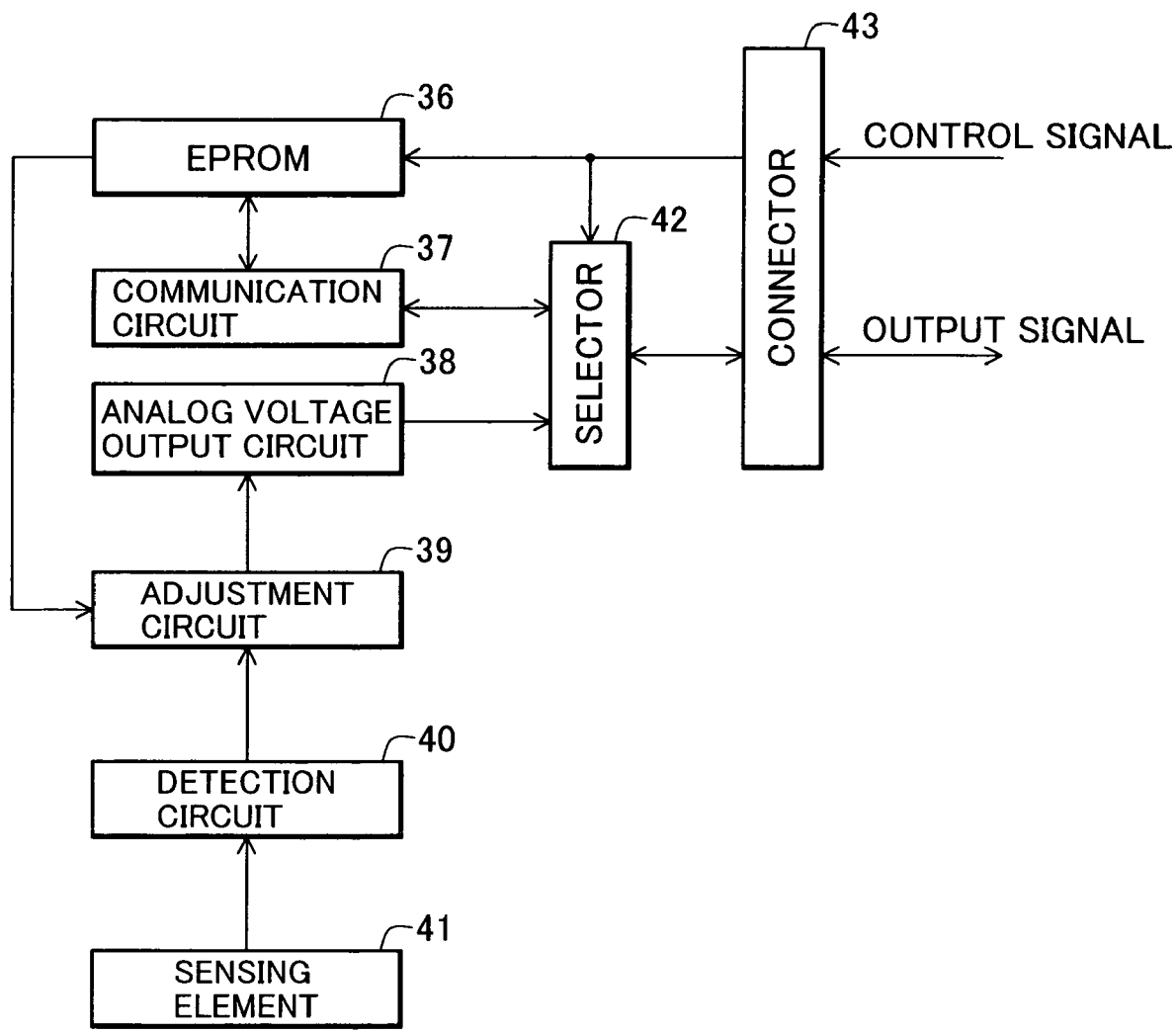
FIG. 15 is a block diagram of the sensor device including the serial data transferring apparatus according to the fourth embodiment.
Figure 16:
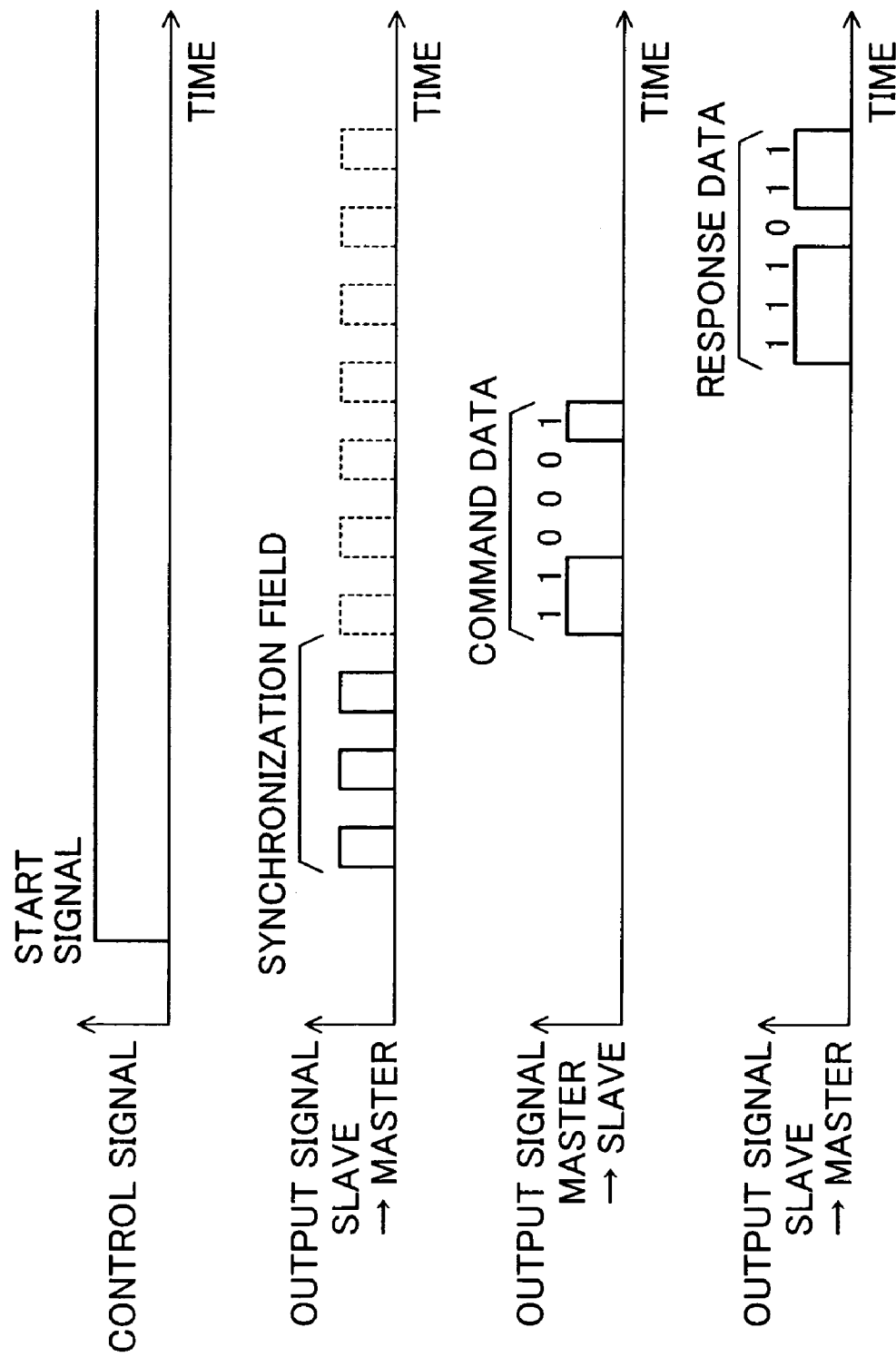
FIG. 16 is a timing chart of signals in the sensor device including the fourth embodiment.

A serial data transferring apparatus according to a fourth embodiment of the present invention will be described below with reference to FIGS. 14, 15 and 16. FIG. 14 is a diagram for explaining a production line of sensor devices each including a serial data transferring apparatus according to a fourth embodiment of the present invention, FIG. 15 is a block diagram of the sensor device including the serial data transferring apparatus according to the fourth embodiment, and FIG. 16 is a timing chart of signals in the sensor device according to the fourth embodiment.

In the manufacturing line shown in FIG. 14, sensor devices 31, 32, 33, 34 and 35 are transported to flow successively along the production line from the left to the right, as viewed in FIG. 14, relative to a check/adjustment device 30. In the state shown in FIG. 14, the sensor device 33 is connected to the check/adjustment device 30.

The serial data transferring apparatus according to any of the first to third embodiments of the present invention is incorporated in each of the sensor devices 31, 32, 33, 34 and 35. By connecting the check/adjustment device 30 to each of the sensor devices 31, 32, 33, 34 and 35 in turn, it is possible to write data, for example, in an internal monitor of the sensor device or an EPROM therein for storing adjustment information through one signal line by utilizing the incorporated communication apparatus.

Further, the use of only one signal line enables a signal terminal to be additionally provided in a connector or the like. Even after complete assembly of the sensor device, therefore, data can be written in the internal monitor of the sensor device or the EPROM therein for storing adjustment information.

Because of the sensor device being mechanically or electrically very sensitive, there is a very strong demand for a capability of adjusting sensor characteristics after complete assembly of the sensor device. At the same time, there is also a demand for minimizing the size of a required circuit to satisfy the above demand.

The serial data transferring apparatus according to the fourth embodiment of the present invention can satisfy those two demands.

The internal configuration of each of the sensor devices 31, 32, 33, 34 and 35 will next be described with reference to FIG. 15.

The sensor device including the fourth embodiment of the present invention comprises a sensing element 41 in which a physical variable changes depending on a measured quantity, a detection circuit 40 for converting a change of the physical variable in the sensing element 41 into an electrical signal, an adjustment circuit 39 for adjusting an output of the detection circuit 40 to a predetermined characteristic, an analog voltage output circuit 38 for outputting, as an analog voltage, an output of the adjustment circuit 39 to the exterior, a communication circuit 37 for executing communication with respect to the exterior, a selector 42 for changing over an output signal between the analog voltage outputted from the analog voltage output circuit 38 and a communication signal connected to the communication circuit, an EPROM 39 for storing adjustment information based on which the adjustment circuit 39 adjusts the characteristic, and a connector 43 for mechanically fixing signal terminals for a control signal and the output signal.

The operation of the sensor device including the fourth embodiment of the present invention will next be described with reference to FIG. 16.

In the sensor device including the fourth embodiment, the selector 42 is controlled in accordance with a control signal so that the output terminal is selectively changed over between the state of outputting the analog voltage and the state of performing communication.

More specifically, when the control signal is at 0 V, the analog voltage output circuit 38 is connected to the output signal and the analog voltage corresponding to a value measured by the sensing element 41 is outputted. When the control signal is at 12 V, the output signal is connected to the communication circuit 37 so as to allow communication from the exterior.

Because of employing 12 V for the control signal, this voltage can also be utilized as a high voltage required for writing data in the PROM 36, and hence a boosting circuit is omitted which must be otherwise incorporated in the sensor circuit. Also, by setting a threshold for the control signal to a relatively high value, a malfunction is harder to occur even when noise is imposed on the control signal.

Further, with the fourth embodiment of the present invention, since the control signal is employed as the start signal indicative of the start of communication, the circuit configuration of the communication circuit is simplified. The communication is performed by successively transferring, as the output signal, the synchronization field, the command data, and the response data in a similar manner to that described above.

A modification of the serial data transferring apparatus according to the fourth embodiment of the present invention will be described below with reference to FIG. 17. FIG. 17 is a timing chart of signals in a modification of the sensor device including the fourth embodiment.

In this modification, a pulse signal is supplied as the control signal and is also employed as the start signal. The communication is realized by successively transferring, as the output signal, the command data and the response data in sync with pulses of the control signal. The use of this type of control signal can also provide similar advantages to those obtainable with the above embodiments.

The embodiments described above are constructed such that the master unit 1 transmits the start signal to the slave unit 2 and, in response to the start signal, the slave unit 2 transmits the synchronization field to the master unit 1. As an alternative, the slave unit 2 may transmit both the start signal and the synchronization field to the master unit 1 and, in response to the start signal, the master unit 1 may transmit the serial data to the slave unit 2 in accordance with the received synchronization field.

Industrial Applicability

According to the present invention, synchronization for data transfer can be established without requiring a quartz oscillator, a PLL, or an oscillator oscillating at frequency several hundreds times as high as a transfer clock. Hence, a serial data transferring apparatus can be realized which is inexpensive and is able to reduce noise.

The invention claimed is:

1. Apparatus for synchronizing serial data transmission in a serial data transferring apparatus comprising:
   receiving means situated at a receiving side, for receiving a start signal indicative of a start of data transfer from a transmitting side;
   means situated at said receiving side for determining that said receiving means has received the start signal, and for generating a pulse train having a frequency that corresponds to a receiving means serial data transfer clock with which the receiving means is able to receive serial data that is to be transmitted;
   a single signal line for transmitting said start signal, said pulse train, and said serial data between said transmitting side and said receiving side;
   serial data output means for sending said pulse train indicative of the receiving means serial data transfer clock to the transmitting side;
   wherein, after sending said pulse train indicative of the receiving means serial data transfer clock to the transmitting side, said receiving means receives a train of serial data transmitted from the transmitting side in sync with the receiving means serial data transfer clock.

2. The serial data transferring apparatus according to claim 1, wherein information indicative of a target, which is to receive the start signal, is superimposed on the start signal.

3. The serial data transferring apparatus according to claim 2, wherein the target which is to receive the start signal, is determined by a number of pulses that are superimposed on the start signal.

4. The serial data transferring apparatus according to claim 1, wherein the start signal has a state fixed to a zero level or a one level and containing information indicative of a target of transmission.

5. Apparatus for synchronizing serial data transmission in a serial data transferring apparatus comprising:
   receiving means situated at a receiving side, for receiving a start signal indicative of start of data transmission from a transmitting side;
   means, situated at said receiving side, for determining that said receiving means has received the start signal, and for sending to the transmitting side a pulse train having a frequency that corresponds to a receiving means serial data transfer clock, for receiving serial data that is to be transmitted from the transmitting side in sync with said receiving means serial data transfer clock;
   serial data output means, situated at said receiving side, for outputting the pulse train indicative of said transfer clock to the transmitting side;
   analog data output means;
   selecting means for selectively changing between said analog data output means and said serial data output means; and
   a single signal line for transmitting said start signal, said pulse train, said analog data, and said serial data between said transmitting side and said receiving side;
   wherein, said selecting means changes from said analog data output means to said serial data output means upon receiving the start signal.

6. The serial data transferring apparatus according to claim 5, further comprising:
   a sensing element for detecting a physical variable of a target to be measured;
   adjusting means for adjusting a detected value from said sensing element to a predetermined characteristic; and
   storage means for storing the predetermined characteristic that is to be adjusted by said adjusting means and is transmitted from the transmitting side; wherein,
   the start signal has a predetermined voltage level; and
   the voltage of the start signal is employed as a voltage source for storing the characteristic data in said storage means.

7. Apparatus for synchronizing serial data transmission in a serial data transferring apparatus comprising:
   means, situated at a transmitting side, for transmitting a start signal indicative of a start of data transfer to a particular receiving side;
   means, situated at a transmitting side, for receiving from the particular receiving side a pulse train having a frequency that corresponds to a serial data transfer clock, said pulse train being indicative of a receiving-side transfer clock for transmitted serial data;
   a single signal line for transmitting said start signal, said pulse train, and said serial data between said transmitting side and said particular receiving side; and
   means for transmitting serial data to the particular receiving side in sync with the receiving-side serial data transfer clock transmitted from the particular receiving side.

8. Apparatus for synchronizing serial data transmission in a serial data transferring apparatus comprising a master unit transmitting serial data and a slave unit receiving the serial data, wherein:
   said master unit comprises means for transmitting a start signal indicative of a start of data transfer to a particular slave unit, receiving means for receiving a pulse train indicative of a slave unit-side serial data transfer clock transmitted from said slave unit, and means for transmitting serial data to said slave unit in sync with the slave unit-side transfer clock transmitted from said slave unit; and
   said slave unit comprises means for receiving a start signal indicative of said start of data transfer from said master unit, means for determining that said receiving means has received the start signal, and for generating a pulse train indicative of a slave unit-side transfer clock of serial data to be transmitted, and serial data output means for outputting the said pulse train indicative of the slave unit-side transfer clock to said master unit.

9. Apparatus for synchronizing serial data transmission in a serial data transferring apparatus comprising:
   means, situated at a receiving side, for transmitting, to a transmitting side, a start signal indicative of a start of data transfer;

means, situated at a receiving side, for transmitting a pulse train having a frequency that corresponds to a serial data transfer clock, said pulse train identifying a receiving-side transfer clock with which the receiving means is able to receive serial data; and means, operable after transmission to the transmitting side of the pulse train identifying the receiving-side serial data transfer clock, for receiving a train of serial data transmitted from the transmitting side in sync with the receiving-side transfer clock;

a single signal line for transmitting said start signal, said pulse train, and said serial data between said transmitting side and said receiving side; and wherein, after transmitting the pulse train indicative of the receiving-side serial data transfer clock to the transmitting side, said receiving means receives a train of serial data transmitted from the transmitting side in sync with the receiving-side transfer clock.

* * * * *